United States Patent [19]
Skulic

[11] Patent Number: 5,957,830
[45] Date of Patent: Sep. 28, 1999

[54] ACTIVE AIR SAMPLING TEMPERATURE SENSOR MODULE FOR INFANT INCUBATOR

[76] Inventor: Vedran Skulic, 7056 N. Monon, Chicago, Ill. 60646

[21] Appl. No.: 08/917,249

[22] Filed: Aug. 25, 1997

[51] Int. Cl.⁶ .................................................... A61G 11/00
[52] U.S. Cl. ................................................................ 600/22
[58] Field of Search ............................... 600/21, 22, 549; 374/163, 159, 208, 210

[56] References Cited

U.S. PATENT DOCUMENTS 5,316,542   5/1994   Koch et al. ................................ 600/22
5,565,903  10/1996   Ueda ....................................... 347/175

*Primary Examiner*—Samuel Gilbert
*Attorney, Agent, or Firm*—Kajane McManus

[57] ABSTRACT

The active air sampling temperature sensor module for an infant incubator includes a housing within which a temperature sensor is located together with a fan which serves to draw air from at least a major portion of the volume in the incubator across the sensor to provide a true (average) instantaneous temperature reading to a controller of the incubator which in turn controls activation of a heating system of the incubator to maintain an optimum temperature within a decreased range of deviation.

7 Claims, 2 Drawing Sheets

ACTIVE AIR SAMPLING TEMPERATURE SENSOR MODULE FOR INFANT INCUBATOR

BACKGROUND OF THE INVENTION

1. Field of the Invention

The present invention relates to an active air sample temperature sensor module for use in an infant incubator. More specifically, the temperature sensor module comprises a housing within which a temperature sensor is located and across which air is drawn by a fan and then expelled.

2. Prior Art

Heretofore various temperature sensors for use in an infant incubator have been proposed. Such sensors do not actively sample air from across the interior of the incubator nor do they create a flow of the air across the sensor.

SUMMARY OF THE INVENTION

According to the invention there is provided an active air sampling temperature sensor module for an infant incubator, the module comprising a housing having a channel therethrough, a temperature sensor mounted within the housing and located within said channel, a fan located within said channel for drawing air through said channel and across said sensor and a connector for operatively engaging said module to a controller of the incubator.

DESCRIPTION OF THE PREFERRED EMBODIMENT

Figure 1:
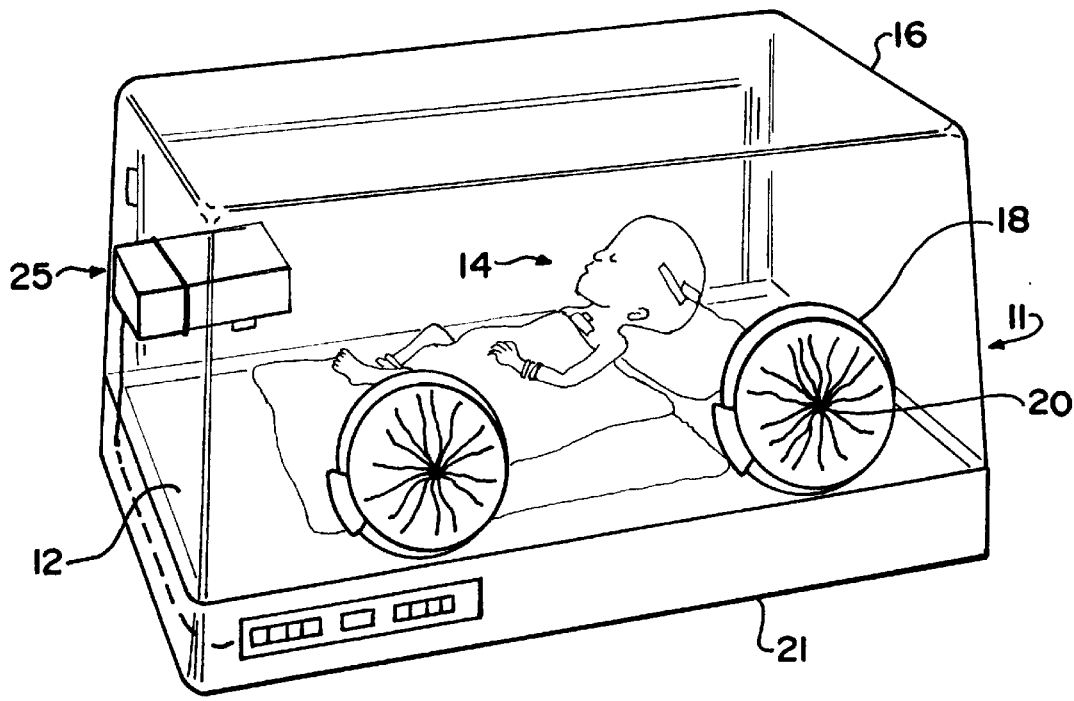
FIG. 1 is a perspective view of an infant incubator incorporating a temperature sensor module made in accordance with the teachings of the present invention.

Referring now to the drawings in greater detail, there is illustrated therein an infant incubator 10 having a housing 11 within which a platform 12 upon which an infant 14 is supinely supported is located.

The incubator 10 has a clear cover 16 for unhampered visibility of the infant 14 and includes flexibly covered hand holes 18 through which one can access the infant 14 with only a small drop in temperature taking place when hole covers 20 are flexed inwardly.

The incubator housing 11 also incorporates a base 21 within which a controller 22, as well as an active heating system 24 (FIG. 3) are located.

Finally, the infant incubator 10 is shown to incorporate in the clear cover 16 thereof a temperature sensor module made in accordance with the teachings of the invention and generally identified by the reference numeral 25.

Figure 2:
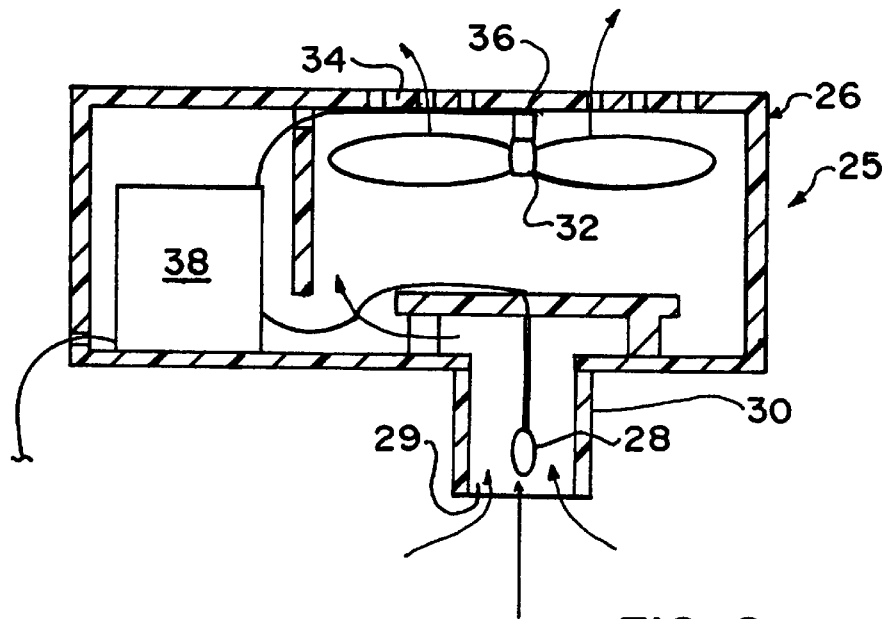
FIG. 2 is an enlarged cross sectional view through the temperature sensor module of FIG. 1.

As shown best in FIG. 2, the module 25 includes a housing 26 within which a temperature sensor or probe 28, such as a thermistor 28, is located. The sensor 28 is positioned within a channel 29 leading into the housing 26 which is formed by a depending tubular sleeve 30 of the housing 26. Also located within the housing 26 is a fan 32 which draws air into the housing 26 via the channel 29 formed by the tubular sleeve 30, across the sensor 28, and then expels the air through a series of air exhaust ports 34 in an adjacent surface 36 of the housing 26.

The sensor 28 and the fan 32 are functionally engaged to a connector 38, or the like, also seated within the housing 26, which provides means for engaging the module 25 to the controller 22 for providing of input to the controller 22 regarding the instantaneous temperature continuously sensed within the incubator 10.

As will be understood, temperature within an incubator 10 must be constantly monitored so that an optimum temperature is maintained at all times.

Also, it will be obvious that the temperature throughout the incubator 10 varies from moment to moment. In this respect, heated air created by the active heating system 24, comprising a heating element 40 downstream of a blower or fan 42, is constantly moving within the incubator 10, and bounces off the cover 16, the infant 14, etc., picking up the temperature of such obstacles, and being modified thereby. Further, hot spots, as well as cold spots, may exist within the incubator 10 due to the air flow patterns therewithin, as simplistically detailed in FIG. 3.

It has been found through empirical testing that passive temperature sensing does not provide an accurate reading because the temperature of an air sample in immediate proximity to the passive sensing apparatus does not reflect the true (average) temperature of a significant volume of the air within the incubator 10.

The active air sampling temperature sensor module 25 of the present invention overcomes this inaccuracy by providing a flow of air across the sensor 28 which is drawn thereto from across the air volume within the incubator 10 by the fan 32.

Figure 3:
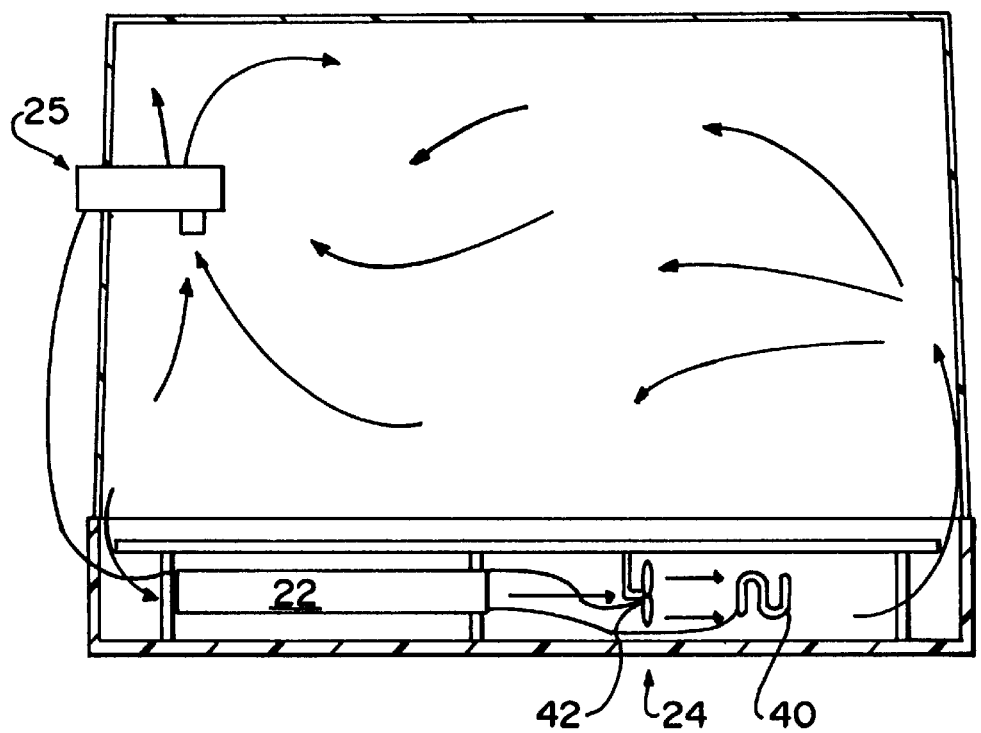
FIG. 3 is a cross sectional view through the incubator of FIG. 1 showing air flow therein as well as air draw of the module as well as showing functional devices located in a base of the incubator.

As best illustrated in FIG. 3, air is drawn into the module 25 by the fan 32 therein, from a substantial volume, if not all, of the air within the incubator 10. With such continuous, instantaneous sensing of a true (average) air temperature, the heating system 24 may be better regulated to maintain a constant optimum temperature within a much smaller range of deviation than has heretofore been possible.

Further, because air is exhausted from the module 25, further mixing of air within the incubator 10 takes place, working toward improved temperature non-gradiation across the air volume.

As described above, the active air sampling temperature sensor module for infant incubator, provides a number of advantages, some of which have been described above and others which are inherent in the invention. Also, modifications may be proposed without departing from the teachings herein. Accordingly, the scope of the invention is only to be limited as necessitated by the accompanying claims.

I claim:

1. An active air sampling temperature sensor module, the module comprising a housing mounted interiorly to a cover of an incubator and having a channel therethrough, a temperature sensor mounted within the module housing and located within said channel, a fan located within said channel for continuously drawing air through said channel, across said sensor, and back into the incubator, and a connector for operatively engaging said module to a controller of a heating system of the incubator.

2. The module of claim 1 wherein said sensor is a thermistor.

3. An active air sampling temperature sensor module comprising a housing mounted to a cover of an incubator and having a channel therethrough, a temperature sensor seated within the channel, a fan for drawing air through the channel from an area above a platform of the incubator and a connector for operatively engaging the module to a controller.

4. In combination with an infant incubator having a cover, a heating system and a controller for activating and deactivating the heating system in response to sensed temperature within the incubator, an active air sampling temperature sensor module comprising a housing fixed interiorly to the cover, means for drawing air through said housing, a temperature sensor mounted within said housing upstream of said means for drawing air therethrough, and means for operatively engaging said module to said controller.

5. The combination of claim 4 wherein said means for drawing air through said housing comprise a fan.

6. The combination of claim 4 wherein said temperature sensor comprises a thermistor.

7. The combination of claim 4 wherein said means for operatively engaging said module to said controller comprise an electronic connector.

* * * * *